Jan. 28, 1941.　　　H. F. BRANDT　　　2,229,721
CAMERA FOR RECORDING EYE MOVEMENTS
Filed Oct. 4, 1937　　　2 Sheets-Sheet 1
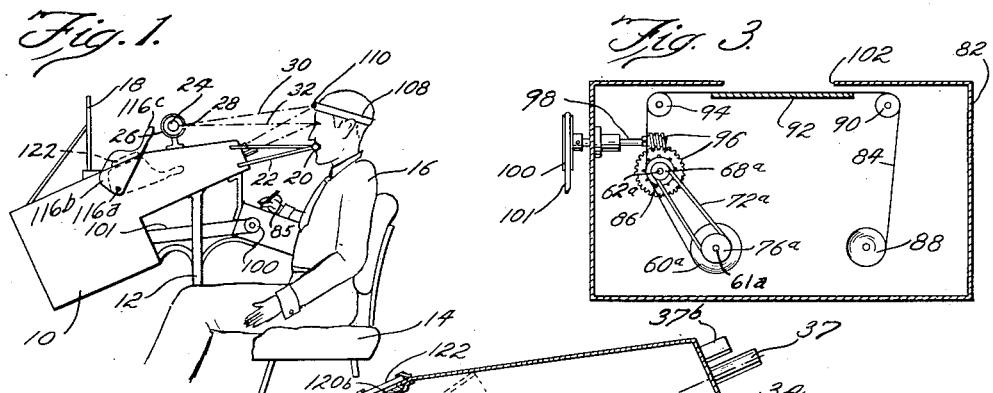
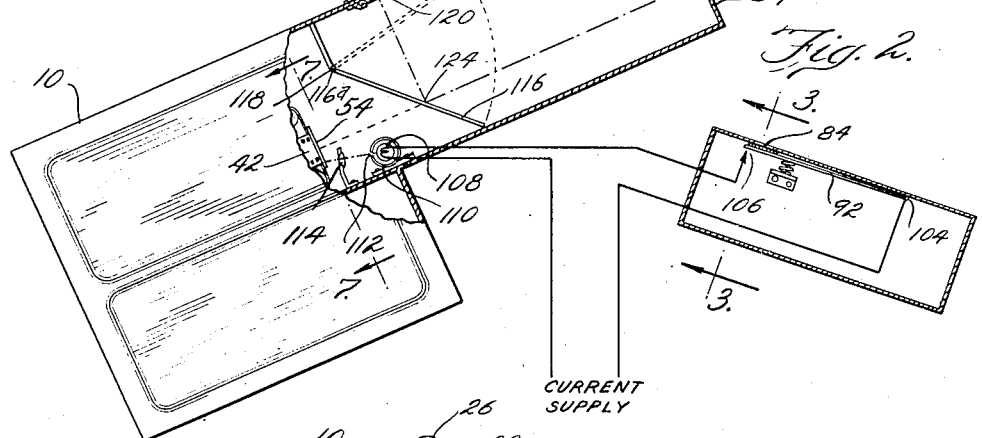
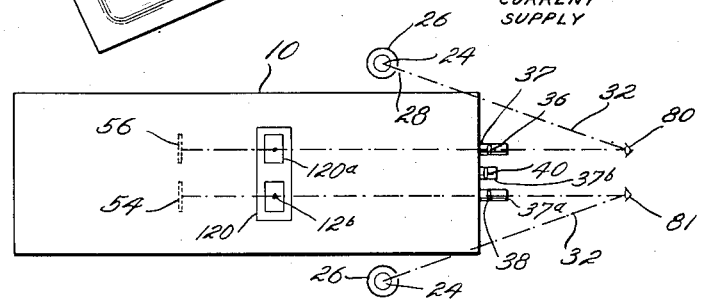
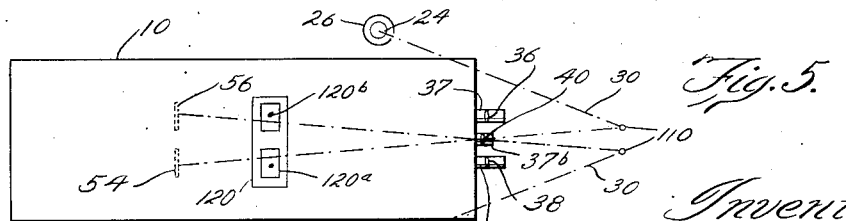
Inventor:
Herman F. Brandt
By: Bair & Freeman
Attys.

Jan. 28, 1941.   H. F. BRANDT   2,229,721
CAMERA FOR RECORDING EYE MOVEMENTS
Filed Oct. 4, 1937   2 Sheets—Sheet 2
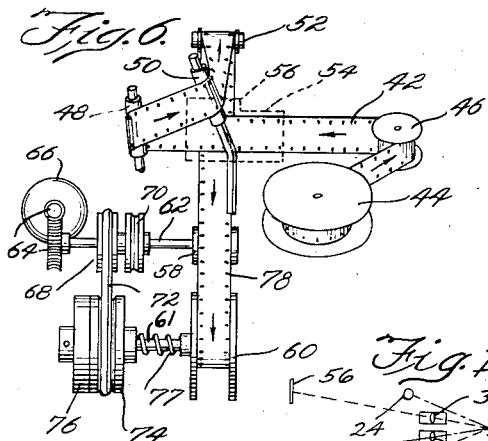
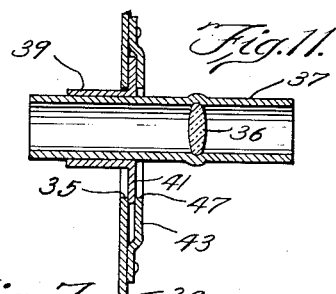
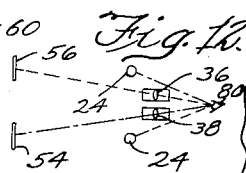
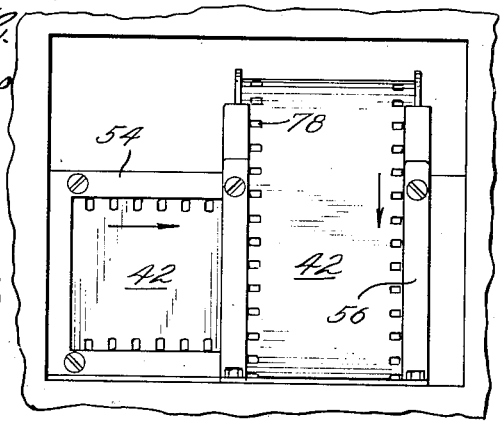
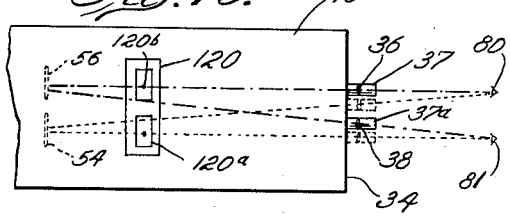
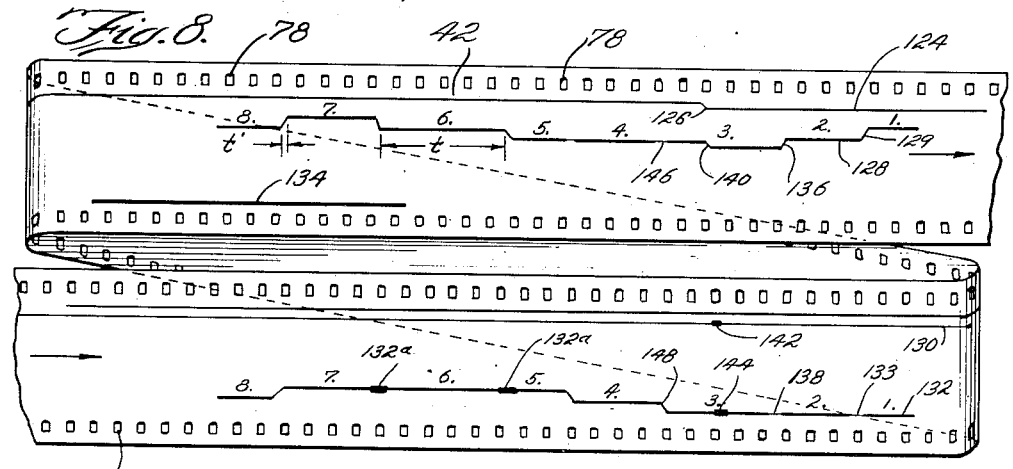
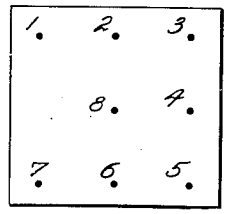
Inventor:
Herman F. Brandt
By Bair & Freeman
Attys.

Patented Jan. 28, 1941

2,229,721

UNITED STATES PATENT OFFICE 2,229,721

CAMERA FOR RECORDING EYE MOVEMENTS

Herman F. Brandt, Des Moines, Iowa, assignor, by mesne assignments, to Look, Inc., Des Moines, Iowa, a corporation of Iowa Application October 4, 1937, Serial No. 167,259

5 Claims. (Cl. 88—20)

It is an object of my invention to simplify the apparatus and to increase the efficiency of equipment for photographing movements of the eyes in the bi-dimensional plane.

It is a further object of my invention to provide an apparatus employing the corneal reflection technique and to so design the apparatus that a single film records simultaneously both the horizontal and vertical movements of the eyes. This arrangement reduces by fifty percent the amount of film required and the labor involved in handling and developing when two separate records are made.

A further object is to provide a camera for recording eye movements in which the film is advanced at a constant rate, eliminating the necessity of a timing trace on the film and making the space which would otherwise be used for such a timing trace available for other records.

Another object is to provide a camera for simultaneous recording of both vertical and horizontal eye movements and vertical and horizontal head movements.

A further object is to provide a camera for recording ocular movements in the bi-dimensional plane which is convertible so that by simple adjustments any of three types of eye movement records may be produced by the same equipment:

1. Horizontal movements of both eyes recorded on the same portion of the film.
2. Vertical movements of both eyes recorded on the same portion of the film.
3. Horizontal movements of one eye and vertical movements of the other eye recorded simultaneously on two distinct longitudinally spaced portions of the film.
4. Horizontal and vertical movements of one eye recorded on two distinct, longitudinally spaced, portions of the film.

Another object is to provide a means for recording both horizontal and vertical head movements with a single lens.

A further object is to provide a camera for obtaining a continuous record of eye movements in which a reflex focusing means is provided for initial adjustment of the lenses with relation to a viewing screen to thereby insure that the tracings on the film will be properly spaced from the edges thereof and interference of the tracings with each other minimized.

Still another object is to provide a device for making a continuous film record of eye movements in connection with a continuously moving paper tape on which the observer or subject being examined may make notes, means being also provided for simultaneously marking the corresponding point on the eye movement film record so that the notes and the film record may be compared.

Still a further object is to provide a camera for recording eye movements which is compact, light in weight and simple, versatile, and economical in use.

With these and other objects in view, my invention consists in the construction, arrangement and combination of the various parts of my camera for recording eye movements, whereby the objects contemplated are attained, as hereinafter more fully set forth, pointed out in my claims and illustrated in the accompanying drawings, in which:

Figure 1 is a side view of a camera apparatus embodying my invention.

Figure 2 is a semi-diagrammatic, vertical, longitudinal view partially in section through my camera apparatus.

Figure 3 is an enlarged sectional view on the line 3—3 of Figure 2.

Figure 4 is a diagrammatic plan view of my apparatus indicating the relation of the optical parts for recording eye movements.

Figure 5 is another diagrammatic plan view of the apparatus showing the relation of the optical parts for recording head movements.

Figure 6 is a perspective view of a film advancing and directing portion of the mechanism.

Figure 7 is a view on the line 7—7 of Figure 2 and shows the film as it passes through the exposure apertures, the film and frames for the exposure apparatus being illustrated in front elevation.

Figure 8 is a section of film showing a typical record.

Figure 9 is a pattern of markings used to obtain the record of Figure 8.

Figure 10 is a diagrammatic plan view showing adjustment of the apparatus to secure different results.

Figure 11 is a sectional view through one of the lens barrels; and

Figure 12 is a diagrammatic view showing the apparatus adjusted for recording both the horizontal and vertical movements of only one eye.

Psychologists have known for some time that the normal human eye, in viewing an object such as a printed page, sees by jumps. That is, the line of vision rests for an instant at some point on the page, then jumps to another point where it rests for another instant, and so on.

For clarity, the matter being viewed is herein referred to as the "content" and the person whose visual pattern is being studied is termed the "subject." For many reasons it is desirable to have some means of obtaining a record showing consecutively and accurately just what are the points in the content matter on which the vision of the subject rests and how long it rests at each point. For example, much could be determined about the visual factors in the learning process if it were possible to compare the "looking" habits of persons who learn readily from a printed page and those of persons who learn with difficulty.

I have provided a device which makes it possible to obtain a continuous photographic record of the path traced out by the subject's line of vision in viewing a particular content. My device makes use of the fact that the human eye ball is not truly spherical in character but has on the front a slight bulge or protuberance. When the subject's line of vision moves horizontally from side to side in viewing some content, the eye ball rotates in its socket and the bulge on the front also moves horizontally. When the subject's line of vision changes from one point to another at a different vertical level, the eye ball rotates and the bulge on the front moves vertically.

If a bright light source of small dimensions is placed near the line of vision, a small spot of light will be reflected from the bulge on the front of the eye ball. This is known as the corneal reflection. As the bulge on the front of the eye ball moves horizontally or vertically, the position of the reflected spot changes correspondingly. It is possible to photograph the reflected spot. If an image of the spot is focused on a film moving continuously at a uniform speed, a continuous record of the eye movements may be obtained in which elapsed time is represented by distances longitudinally of the film.

Where the content is two-dimensional, lying in a single plane approximately perpendicular to the line of vision, it is possible to enlarge the film record, by any suitable optical or mechanical means, to the scale of the original content and to retrace thereon the visual pattern. Where the longitudinal speed of the film at the time of exposure was known, it becomes possible to determine the length of time during which the line of vision rested on each particular point.

In the accompanying drawings I have used the reference numeral 10 to indicate generally a light-tight casing mounted on a support 12. Suitably disposed relative thereto is an adjustable chair 14 for the subject 16. A vertical board 18 is provided for conveniently mounting content matter at a viewing distance from the subject. A bite bar 20 is fixedly attached to the camera by a bracket 22. The subject is to grip the bite bar with his molars and this means has been found very satisfactory for minimizing movements of the head while a record is being made.

Lamps 24 are contained in housings 26 at each side of the casing 10. On the sides facing the subject 16 the housings 26 have small openings 28 through which light rays 30, 32 are emitted. On the front panel 34 of the casing 10 are mounted lenses 36, 38 and 40, each of which are mounted on the panel 34 in a manner to secure adjustment.

By way of illustration, I show in Figure 11, a barrel 37 in which the lens 36 is supported. The barrel 37 is slidable in a sleeve 39 for focusing purposes. The sleeve 39 is formed on a disk 41 confined against the front panel 34 of the camera by a flange member 43. It will be noted that the panel 34 has an opening 35 and similarly the flange 43 has an opening 47. The openings 35 and 47 are larger in diameter than the sleeve 39 so that the flange 41 can be shifted relative to the panel 34 and thereby the position of the lens 36 shifted within given limits either vertically or horizontally relative to the panel 34. It is understood that each of the lenses 36, 38 and 40 are supported in the manner shown in Figure 11, their barrels being indicated as 37, 37a and 37b respectively. The means described eliminates the possibility of any stray light getting into the casing 10, yet permits the desired positioning of the lenses relative to the panel 34 for focusing purposes.

Contained within the casing 10 is a ribbon of photographic film 42. Means for feeding and guiding the film through the camera includes a supply spool 44 on which the film is initially contained. Guide rollers 46, 48, 50 and 52 as shown in Figure 6 are so disposed that they guide the film 42, first through a horizontal gate 54 and then through a vertical gate 56. A feed sprocket 58 propels the film and a take-up spool 60 finally receives it.

The sprocket 58 is mounted on a shaft 62 which is driven through worm gears 64 by a constant speed motor 66. The shaft 62 also carries pulleys 68 and 70. A belt 72 on the pulley 68 rotates the spool 60 through a pulley 74 and friction drive means illustrated as a disk 76 secured to a shaft 61. The disk 76 is urged to frictionally engage the pulley 74 by a spring 77. The take-up spool 60 is also secured to the shaft 61.

The sprocket 58 engages perforations 78 at the edge of the film and causes the film to move at uniform rate from the spool 44, over the roller 46, through the horizontal gate 54, around the rollers 48, 50 and 52 in succession, through the vertical gate 56, over the sprocket 58 and on to the spool 60. Arrows on the film in Figures 6, 7 and 8 show the direction of film motion.

The image of a stationary spot of light focused on a moving film gives a record which is a straight line longitudinally of the direction of motion of the film. If the spot of light moves transversely of the direction of motion of the film, the image of the spot will also move transversely of the direction of motion of the film and the recorded line will show a jog or displacement. If the scalar proportions are known, the magnitude of movement of the spot may be determined by measuring the displacement of the line on the film or by enlarging the film to the proper scale. If the spot of light moves in a direction parallel to the line of motion of the film, there is no transverse displacement of the recorded line. If the image of the spot moves in the same direction as the film, i. e., "follows" the film, the exposure of the film will be somewhat greater at the point where this occurs and the recorded line will show a dark portion. If the image of the spot moves in the direction opposite to the film movement, the exposure will be less and the line will show a thin or light portion. It is not practical to measure the lengths of these portions in directions parallel to the film travel because they blend in with the rest of the recorded trace and the boundaries are uncertain.

From the above it will be seen that a satisfactory record is obtained only of motion in a direction transverse to the direction of film travel. Hence, to record movements of the eyes in both vertical and horizontal directions, it is desirable to make two film records, one on a horizontally moving film to show vertical eye movements and another on a vertically moving film to show horizontal eye movements. In my camera I have provided means whereby both records may be obtained on a single film without complicated and expensive lens or prism systems.

As shown in Figure 4, the corneal reflection of the right eye 80 is focused by the lens 36 on the vertically moving film in the gate 56, where horizontal movements of the right eye will be recorded as lateral deflections in the recorded line on the film. Similarly the corneal reflection of the left eye 81 is focused by the lens 38 on the horizontally moving film in the gate 54, where vertical movements of the left eye will be recorded as lateral deflections in the recorded line. The gates 54 and 56 shown in Figure 7 are arranged so that as nearly as possible the horizontally moving portions and the vertically moving portions of the film 42 lie in the same plane. They cross each other with a minimum distance between the vertically and horizontally moving portions.

In connection with my camera, I employ a memorandum device comprising a housing 82 (see Figure 3) in which is contained a paper strip 84 which is engaged by a drive sprocket 86. The sprocket 86 pulls the strip 84 from a supply roll 88 successively over a roller 90, back plate 92 and roller 94. A take-up spool 60a is rotated by suitable means, similar to the friction drive for the spool 60, the parts of which bear the same reference numerals with the addition of a. A shaft 98 carrying a pulley 100 is operatively connected through worm gearing 96 with the shaft 62a on which the sprocket 86 is mounted. The pulley 100 is connected by means of a belt 101 to the pulley 70 of Figure 6 on the shaft 62.

An aperture 102 in the top surface of the housing 82 exposes the portion of the paper strip 84 passing over the back plate 92. The housing 82 is located at some point conveniently adjacent the camera so that the experimenter may make pencil notations on the slowly moving paper tape 84. As shown in Figure 2 the back plate 92 is mounted on a pivot 104 and is normally held in a raised position by a spring 106. The pressure transmitted through the paper tape 84 when a memorandum is made as by writing on the paper strip 84 with a pencil 85, causes the back plate to engage a contact 106 and thereby to close an electrical circuit including a lamp 108. The lamp is contained in a housing 110 having a small opening 112.

An image of the opening 112 is focused by the lens 114 on the film 42 passing through the gate 54. Consequently, whenever a memorandum is made on the strip 84, the lamp 108 is lighted, the opening 112 is illuminated, and an image of the illuminated opening is projected on the film. An intermittent trace is thereby recorded upon the film 42, and the record provided enables the experimenter to identify readily the portion of the eye movement record in connection with which a particular memorandum or written observation was made on the paper strip 84.

It is obvious that if the subject moves his head either horizontally or vertically while a record is being made, the movement will be recorded as an apparent movement of the eye, and consequently it is highly desirable to have some means of identifying such false indications on the record. The use of the bite bar 20, as above set forth, has been found very successful in reducing such false movements to a minimum, but with some subjects it is desirable to have means of detecting and recording head movements.

For this purpose I provide a band 108 which may be made adjustable to fit around the top of the subject's head, as shown in Figure 1. On the front of this band I mount two reflectors 110 which may be of any suitable character to give a reflection similar to that of the cornea of the eye. As a specific example I have used steel ball bearings for this purpose. Light rays 30 from the openings 28 are reflected by the reflectors 110 to the lens 40 in the lens tube 37b. This lens tube is so located, as shown in Figure 5, that the spot from the right reflector 110 will be imaged upon the portion of the film 42 in the gate 54 and will consequently record vertical head movements. The spot from the left reflector 110 is imaged by the lens 40 on the portion of the film 42 in the vertical gate 56 and will record horizontal head movements on the film at that point.

In order to avoid confusion, the various traces on the film must necessarily occupy separate portions transversely of the film. The slidable mounting of the lens tubes 37, 37a and 37b on the front panel 34 makes it possible to focus each spot on a portion of the film selected for it. To simplify the focusing operation and to avoid fogging or spoiling film during focusing, I provide a mirror or reflector 116 pivoted at 118. When this mirror is in the full line position of Figure 2, it reflects the images of the spots to a ground glass screen 120 mounted in the top of the housing 10. A slide 122 is provided outside the screen 120, which is removed only when the mirror 116 is in the full line position. The mounting of the mirror 116 and the location of the screen 120 are so selected that the distance from the point 124 to the film 42 in the gates 54 and 56 shall be the same as the distance from the point 124 to the screen 120. Consequently, when the mirror 116 is in the full line position and the slide 122 is removed to allow viewing of the screen, the images may be properly focused on the screen and will be in focus on the film when the mirror is raised to the dotted line position. The mirror is not raised, however, until the slide 122 has been replaced, so that no light will reach the film except such light as comes through the lenses. By way of illustration I show the following described means to prevent opening of the slide, except when the mirror is in the full line position of Figure 2. The mirror is mounted on a shaft 116a so that rotation of the shaft will swing the mirror. Outside the casing 10 a sector 116b is secured to the shaft and this sector may be provided with a handle 116c for the convenience of the operator in swinging the mirror. Normally the sector 116b is in the full line position of Figure 1 and the mirror 124 is in the dotted position of Figure 2. The sector in this position covers the end of the slide 122 so that it cannot be withdrawn. When the handle 116c is swung to the dotted line position of Figure 1, the mirror 116 will assume the full line position shown in Figure 2 and in this position it will be noted that the sector 116b is in a position below the slide 122 and will therefore permit it to be slid open. A suitable masking indicated at 120a may be provided in connection with the screen 120 so that the areas exposed on the screen correspond to the exposure areas in the gates 54 and 56.

Figure 8 represents a section of film carrying a typical set of records as made possible by my invention. As previously set forth, records of vertical movements are made on the portion of film in the gate 54 and records of horizontal movements are made on the portion of film in the gate 56. The portions of film in the two gates are necessarily spaced longitudinally of the film by a distance represented by the length of film passing over the rollers 48, 50 and 52 from gate 54 to gate 56. This length remains constant and the record of vertical movements is therefore spaced a constant distance longitudinally of the film from the corresponding simultaneous record showing horizontal movements. Thus I eliminate the problem of synchronizing the records on two films with each other as in an apparatus where two separate films are used, one for recording movements of the left eye and the other for recording movements of the right eye.

The length of film represented in Figure 8 is shown in two portions, the upper portion having the record of horizontal movements and the lower portion having the record of vertical movements. The two portions are so disposed in the drawings that any vertical line projected through them passes through points in the two records which were simultaneously exposed in the two gates 54 and 56.

A trace 124 is produced by the image of the spot reflected from the left head movement reflector 110. Thise image is focused by the lens 40 on the film in the gate 56 (see Figure 5) and records horizontal head movements as deflections of the line transversely of the film. A trace 128 is produced by the corneal reflection from the right eye 80 as focused by the lens 36 on the film in the gate 56 and records horizontal eye movements. A trace 130 is produced by the image of the spot from the right head movement reflector 110 as focused on the film in the gate 54 by the lens 40 and shows vertical head movements. A trace 132 is the record of the corneal reflection from the left eye 81 as focused by the lens 38 on the film in the gate 54 and indicates vertical eye movements as transverse deflections. A trace 134 is the recorded image of the illuminated opening 112 as focused on the film by the lens 114.

Figure 9 incorporates a pattern of dots such as might have been the content matter from which the traces 128 and 132 were obtained. In Figure 8 the numbers 1 to 8 above sections of the traces 128 and 132 indicate the dots in Figure 9 on which the subject's vision was fixated. Throughout the time indicated by the section 1, the subject was looking at dot 1. Movement of the line of vision from dot 1 to dot 2, a horizontal movement, is indicated by the lateral displacement in trace 128 at 129. The horizontal movement also appears on the horizontally moving film in gate 54 as a portion of less exposure in the trace indicated by a light portion in the trace 132 at 133. The exposure at point 133 is reduced because at that point the focused spot momentarily moved horizontally in the aperture 54 in a direction opposite to the uniform horizontal movement of the film.

When the subject's fixation changes from dot 2 to dot 3, a lateral displacement 136 is recorded in trace 128 similar to the one at 129 and a portion of less exposure 138 occurs in trace 132, similar to that of point 133. The magnitudes of the lateral displacements between the sections 1 and 2 and between the sections 2 and 3 in trace 128 are proportional to the distances on the content matter through which the line of vision moves, i. e., are proportional, respectively, to the distances between the dots 1 and 2 and between the dots 2 and 3. By projecting the film in any suitable way so that the trace 128 appears magnified, the displacements may be easily measured.

At point 140 the deflection of trace 128 seems to indicate that there was a horizontal eye movement. However, a similar deflection in trace 124 at point 126 indicates that the deflection at 140 was caused by a head movement and should be disregarded in analyzing the eye movements, except insofar as further eye movements traced on the film must be compensated for by considering the displacement at 126 and adding its proportional magnitude to the distance of the trace 128 from the edge of the film. The deflection at points 126 and 140 is in a direction opposite to that a point 136 and there is a corresponding horizontal movement of the focused spot in the aperture 54 in the direction of film movement. Portions of increased exposure occur in traces 130 and 132 at 142 and 144 due to the head and left eye movements being in the direction opposite that of film travel.

When the subject's line of vision changes from dot 3 to dot 4, the downward vertical movement is recorded as a light portion at 146 and a lateral displacement at 148. Similar points in the recorded traces are obvious as the subject looks successively at dots 5, 6 and 7. The left eye, in moving from dot 5 to dot 6, and from dot 6 to dot 7 moves in a direction opposite film travel and accordingly produces additional exposure on the trace 132 as indicated at 132a.

When the fixation changes from dot 7 to dot 8, the movement involves both vertical and horizontal components. In Figure 9 dot 8 lies horizontally in line with dot 4 and vertically in line with dot 6. Hence the section 8 of trace 128 is a continuation of the section 6 and the section 8 of trace 132 is a continuation of the section 4 and on both traces appears as a displacement rather than as a displacement on one and a thickened or thinned portion on the other, as when eye movements are vertical or horizontal only.

The film record of Figure 8 is then a history of the fact that the subject looked in numerical order at a set of points having the same dimensional and directional relations as the dots of Figure 9. By having the subject look first at certain definite reference points, such as the corners of the content matter, the scalar relations between distances on the content matter and deflections of the recorded trace on the film may be determined in order to facilitate reconstruction of the vision pattern of the subject.

Most ocular movements are of the character represented by section 8 of traces 128 and 132, comprising both horizontal and vertical components. However, when the scalar proportions mentioned above and the reference points are known, it is possible to reconstruct on the content the visual path traversed by the subject in viewing it. Not only may the various fixation points be located, but inasmuch as the film is advanced uniformly during the recording process, the time for which any particular fixation was maintained is represented by a distance longitudinally of the film. For example, the time during which the subject looked at dot 6 is represented by the distance $t$ shown on section 6 of trace 128. The time represented by such a distance will obviously depend on the speed at which the film is run. Likewise, the distance $t'$ gives an indication of the time it took for the subject to shift his eyes from point 7 in Figure 9 to point 8.

The trace 134 is an indication that a written memo was made on the paper strip 84 and serves to mark the portion of the film record in connection with which the memo was made. For example, the experimenter may ask the subject a question, making a note on the strip 84 at the time. He then has a record on the strip as to the nature of the question, and the mark on the film which will enable him to locate the corresponding portion of the eye movement record and to study the subject's ocular response to the question. Of greater importance however is the possibility for the subject to answer a question as by writing on the strip 84 with the pencil 85 as in Figure 1, thus indicating to the experimenter the exact time in relation to the subject's vision pattern when he arrives at his answer to the question. This method of recording responses is not likely to cause head movements and also provides a permanent record.

The location of the gates 54 and 56 and the adjustable mountings of the lens barrels 37, 37a and 37b in the front of my camera are such as to permit the making of other kinds of records than that shown in Figure 8. It may be desirable to obtain comparative records of the simultaneous horizontal movements of both eyes, or of vertical movements of both eyes. As shown in Figure 10, the lens tubes 37 may remain as in Figure 4 and the lens tube 37a may be adjusted to a position closer to it so that the corneal reflection from the left eye 81 is focused in gate 56 in addition to the reflection of the right eye 80. A record of the horizontal movements of both eyes side by side is thereby obtained. Similarly the lens tube 37a may remain as in Figure 4 and the lens tube 37 may be adjusted closer to it so the tubes are then located in the dotted line position to focus both images in gate 54 and give a record of the vertical movements of both eyes. Such a record is of value in studying and analyzing the ocular behavior of persons whose eyes do not work together properly.

Some of the uses of my camera have already been suggested. It is of great value in the study and analysis of ocular behavior patterns in connection with the learning process. Very interesting and significant information may be secured by studying the visual procedure of students assigned to a particular task which involves eye movements. For example, I have made records of the visual patterns of a subject assigned to check a completed exercise in long-division in which there was an error. I found that the student's failure to locate the error in the time allowed arose from the fact that he failed to proceed methodically and did not even fixate on the point where the error was to be found.

The record obtained by means of my camera amounts in some cases almost to a mind-reading means, inasmuch as it is possible to ascertain with considerable certainty the exact point, within a fraction of a second, at which the subject grasped or comprehended the problem assigned to him. The recording of written answers and questions on the tape 84 and the trace 134 on the film is of considerable value in this connection.

In order to make a record of vertical movements of both eyes on the same portion of the film as advisable, for instance, when the subject has a peculiarity of eye movement wherein the right and left eyes do not move similarly, the apparatus can be adjusted as shown in Figure 10. Dot and dash lines indicate how reflections from both eyes can be focused on the film in the gate 56 by positioning lenses 36 and 38 relative to the front panel 34 of the casing 10. Similarly, dotted lines show how the reflections from both eyes can be focused in the gate 54. The lenses 36 and 38 are shifted to the dotted position for this adjustment. In Figure 12 I illustrate how with two sources of light, the horizontal movements of one eye can be recorded in one of the gates and the vertical movements of the same eye can be recorded in the other one. This is particularly desirable when the eyes of the subject do not move simultaneously with each other and it is desirable to make a record of the horizontal and vertical movements of only one eye. The two light sources 24 serve to cause reflections at different angles so that two distinct reflections from the same eye may pass to both of the gates 54 and 56.

Uses such as those suggested above are most valuable in the psychological laboratory. However my camera also has very important commercial uses. By means of it I can determine just what portion of an advertisement or advertising lay-out attracts the subject's attention. The film record shows the portion of the lay-out which first attracts the subject's vision. It shows the points at which his eye lingers longest and it shows the points to which his attention returns repeatedly. I need hardly emphasize the importance of such a device to the advertising profession. By setting up two advertisements side by side on the board 18 and exposing them simultaneously to the subject's view, I can determine which advertisement first attracts the subject's attention and which one receives the greater portion of his attention. Consequently it is possible for me, by making such tests with a large number of subjects, to rank advertising content matter of various kinds according to its attention value.

I have therefore provided an apparatus which constitutes a scientific means whereby the advertising man may determine whether one lay-out or color combination is better than another, and in addition to this he may also determine with considerable accuracy just why one is better than another, by a study of the ocular behavior of typical subjects with relation to the content matter.

By analyzing eye-movement habits of various subjects, it is possible to discover inefficiencies in such habits and instruct them as to how their eye-movement efficiency can be increased, thus aiding materially in their education. My apparatus enables the examination of vision patterns for all types of content, the study of all types of ocular movements in the bi-dimensional plane and the evolvement therefrom of training means and methods for eye movements.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a camera for recording corneal reflections from the eyes of a subject, a housing, a single light sensitive recording strip, means for supporting said single light sensitive recording strip in said housing, said means including a plurality of guide means for controlling the paths of movement of said strip, means for moving said strip in the paths provided by said guide means, one of said guide means being fixed with relation to said housing to limit the path of movement of said strip therethrough to one direction, and another of said guide means being fixed with relation to said housing and with relation to said first guide means to limit the path of movement of said strip therethrough to a direction substantially perpendicular to said first mentioned direction, and light focusing means adjustably mounted on said housing, said light focusing means being adjustable with reference to said housing for focusing the corneal reflection from one of the subject's eyes on a portion of said single light sensitive recording strip moving in said first mentioned direction and for focusing the corneal reflection from the other eye of said subject on a second portion of said single light sensitive recording strip at a position spaced a predetermined distance from said first portion and moving in said second mentioned direction whereby the recordings on said first and second portions of said single film will be in substantially constantly spaced relation to each other.

2. In a camera for recording corneal reflections from the eye of a subject, a housing, a single light sensitive recording strip, means for supporting said single light sensitive recording strip in said housing, said means including a plurality of guide means for controlling the paths of movement of said strip, means for moving said strip in the paths provided by said guide means, one of said guide means being fixed with relation to said housing to limit the path of movement of said strip therethrough to one direction and another of said guide means being fixed with relation to said housing to limit the path of movement of said strip therethrough to a direction substantially perpendicular to said first mentioned direction, and a pair of optical systems mounted on said housing for focusing a corneal reflection from the subject's eye on a portion of said single light sensitive recording strip moving in said first mentioned direction and for focusing a second corneal reflection from the subject's eye on a second portion of said single light sensitive recording strip at a position spaced a predetermined distance from said first position and moving in said second mentioned direction whereby the respective records on said first and second portions of said single light sensitive recording strip will be spaced a substantially constant distance apart.

3. In a camera for recording corneal reflections from the eye of a subject, a housing, means adapted to support a single light sensitive recording strip in said housing, said means including a plurality of guide means for controlling the paths of movement of such recording strip, means for moving such recording strip in the paths provided by said guide means, one of said guide means being fixed with relation to said housing to limit the path of movement of such recording strip therethrough to one direction and another of said guide means being fixed with relation to said housing and to said first guide means to limit the path of such recording strip coming from said first guide means, through said second guide means, to a direction substantially perpendicular to said first mentioned direction, and light focusing means mounted on said housing for focusing a corneal reflection from the subject's eye on a portion of such single light sensitive recording strip moving in said first mentioned direction and for focusing a second corneal reflection from the subject's eye on a second portion of such single recording strip at a position spaced a predetermined distance from said first portion and moving in said second mentioned direction.

4. In a camera for recording corneal reflections from the eye of a subject, a housing, means adapted to support a single light sensitive recording strip in said housing, said means including a plurality of guide means for controlling the paths of movement of such recording strip, means for moving such recording strip in the paths provided by said guide means, one of said guide means being fixed with relation to said housing to limit the path of movement of such recording strip therethrough to one direction and another of said guide means being fixed with relation to said housing and to said first guide means to limit the path of such recording strip to a direction substantially perpendicular to said first mentioned direction, still another of said guide means receiving such recording strip from said one of said guide means, bending it so as to change its direction of travel and directing it to said another of said guide means, and light focusing means mounted on said housing for focusing a corneal reflection from the subject's eye on a portion of such single light sensitive recording strip moving in said first mentioned direction and for focusing a second corneal reflection from the subject's eye on a second portion of such single recording strip at a position spaced a predetermined distance from said first portion and moving in said second mentioned direction.

5. In a camera for recording corneal reflections from the eye of a subject, a housing, means adapted to support a single light sensitive recording strip in said housing, said means including a plurality of guide means for controlling the paths of movement of such recording strip, means for moving such recording strip in the paths provided by said guide means, one of said guide means being fixed with relation to said housing to limit the path of movement of such recording strip therethrough to one direction and another of said guide means being fixed with relation to said housing and to said first guide means to limit the path of such recording strip coming from said first guide means, through said second guide means, to a direction substantially perpendicular to said first mentioned direction, means for producing and directing a beam of light on the cornea of the subject's eye to be reflected therefrom, focus means for receiving the reflected beam of light and focusing it on a portion of such recording strip moving in said first mentioned direction, means for producing and directing a second beam of light on the cornea of the subject's eye to be reflected therefrom, and focus means for receiving the second reflected beam of light and focusing it on a second portion of such single recording strip at a position spaced a predetermined distance from said first portion and moving in said second mentioned direction.

HERMAN F. BRANDT.